(12) United States Patent
Alzner et al.

(10) Patent No.: US 7,320,204 B2
(45) Date of Patent: Jan. 22, 2008

(54) PROCESS AND APPARATUS FOR ENCAPSULATING A PHOTO-STIMUABLE PHOSPHOR IMAGING PLATE WITHIN A BARRIER ENVELOPE AND A BARRIER ENVELOPE THEREFORE

(75) Inventors: Edgar Alzner, Garden City, NY (US);
Henry Hubner, Amityville, NY (US);
Yehuda Rosenstock, Freeport, NY (US); John Sylvester, Garden City, NY (US)

(73) Assignee: Air Techniques, Inc., Melville, NY (US)

( * ) Notice: Subject to any disclaimer, the term of this patent is extended or adjusted under 35 U.S.C. 154(b) by 54 days.

(21) Appl. No.: 11/342,034

(22) Filed: Jan. 30, 2006

(65) Prior Publication Data

US 2006/0169406 A1    Aug. 3, 2006

Related U.S. Application Data

(60) Provisional application No. 60/648,748, filed on Feb. 2, 2005.

(51) Int. Cl.
*B65B 25/00* (2006.01)
*B65B 9/00* (2006.01)
*B65B 51/10* (2006.01)

(52) U.S. Cl. .............. 53/459; 53/469; 53/479; 53/492; 53/571; 53/284.4; 53/284.7; 53/374.8; 53/374.9; 53/381.1; 53/384.1; 53/390; 53/391

(58) Field of Classification Search ............. 53/569, 53/570–572, 284.3, 284.4, 284.7, 374.8, 53/374.9, 381.1, 381.5, 381.7, 390, 391, 53/459, 469, 479, 492

See application file for complete search history.

(56) References Cited

U.S. PATENT DOCUMENTS

| | | | | | |
|---|---|---|---|---|---|
| 3,477,196 | A | * | 11/1969 | Lerner | 53/479 |
| 3,481,102 | A | * | 12/1969 | Dolman | 53/459 |
| 3,882,656 | A | * | 5/1975 | Lerner | 53/459 |
| 3,938,299 | A | * | 2/1976 | Lerner | 53/434 |
| 3,948,015 | A | * | 4/1976 | Lerner | 53/434 |

(Continued)

*Primary Examiner*—Stephen F Gerrity
(74) *Attorney, Agent, or Firm*—Clifford G. Frayne

(57) ABSTRACT

There are disclosed by a process and apparatus for positioning and sealing photostimuable phosphor imaging plates within barriers envelope blanks therefore and formed on a roll thereof wherein a barrier envelope blank including a U-shaped heat sealed portion thereof of such roll is indexed to a positioning station whereat the barrier envelope blank is caused to be opened at a free end thereof thereby permitting insertion of a restored imaging plate into such barrier envelope whereupon the barrier envelope including restored imaging plate is indexed to a station whereat heat sealing of the free end of the U-shaped heat sealed is effected to thereby enclose the restored imaging plate therein and thereafter the thus heat sealed barrier envelope is indexed to a product station for removal from the roll of barrier envelope blanks.

11 Claims, 3 Drawing Sheets

U.S. PATENT DOCUMENTS

| | | | |
|---|---|---|---|
| 3,956,866 A * | 5/1976 | Lattur ......................... 53/459 |
| 4,014,154 A * | 3/1977 | Lerner ......................... 53/459 |
| 4,139,978 A * | 2/1979 | Jensen et al. ................. 53/167 |
| 4,334,399 A * | 6/1982 | Onishi ........................... 53/69 |
| 4,336,681 A * | 6/1982 | Onishi ......................... 53/459 |
| 4,378,666 A * | 4/1983 | Onishi ......................... 53/570 |
| 4,586,318 A * | 5/1986 | Litt et al. ..................... 53/459 |
| 4,644,731 A * | 2/1987 | Zangheri ..................... 53/411 |
| 4,928,455 A * | 5/1990 | Gereby et al. ................ 53/570 |
| 5,094,061 A * | 3/1992 | Evers ........................... 53/567 |
| 5,115,626 A * | 5/1992 | Rutter et al. .................. 53/468 |
| 5,709,069 A * | 1/1998 | Cronauer ..................... 53/459 |
| 5,970,688 A * | 10/1999 | Nyiendo et al. .............. 53/573 |
| 6,827,214 B2 * | 12/2004 | Alzner et al. ............... 206/455 |
| 6,866,149 B2 * | 3/2005 | Alzner ....................... 206/455 |
| 2003/0147503 A1 * | 8/2003 | Alzner et al. ............... 378/175 |
| 2003/0209594 A1 * | 11/2003 | Alzner ....................... 229/307 |

* cited by examiner ic # PROCESS AND APPARATUS FOR ENCAPSULATING A PHOTO-STIMUABLE PHOSPHOR IMAGING PLATE WITHIN A BARRIER ENVELOPE AND A BARRIER ENVELOPE THEREFORE

CROSS-REFERENCE TO RELATED APPLICATIONS

Applicant claims the benefit of provisional application Ser. No. 60/648,748, filed Feb. 2, 2005.

BACKGROUND OF THE INVENTION

1. Field of the Invention

This invention relates to photo-stimuable phosphor imaging technology, and more particularly, to a process and apparatus for encapsulating a photo-stimuable phosphor imaging plate within a barrier envelope.

2. Background of the Prior Art

The use of photo-stimuable phosphor imaging plates in a dental operatory are replacing the usage of x-ray films since photo-stimuable phosphor imaging plates are reusable over an extended period of time. Photo-stimuable phosphor imaging plates are similarly exposed to a source of x-ray radiation, however are thereafter optically scanned with the resulting information stored in a suitable computer processing unit. In U.S. patent application Ser. No. 10/919,123, filed Aug. 16, 2004, assigned to the same assignee as the present invention there is disclosed a process and apparatus for optically scanning exposed photostimuable phosphor imaging plates. In U.S. Pat. No. 6,866,149, assigned to the same Assignee as the present invention, there is disclosed a barrier envelope used for protecting the restored image plate.

Since such exposed photostimuable phosphor imaging plates are reusable, the thus scanned imaging plate is subjected to luminescence to discharge electrons forming the latent image to restore imaging capability. In U.S. Pat. No. 6,778,776, issued Aug. 17, 2004, and assigned to the same assignee as the present invention, there is disclosed an apparatus for restoring imaging capabilities of exposed photostimuable phosphor imaging plates. Such restored imaging plates must be enclosed in a barrier envelope prior to reuse.

OBJECTS OF THE PRESENT INVENTION

An object of the present invention is to provide a process and apparatus for positioning and sealing restored photostimuable phosphor imaging plates in a barrier envelope in a facile manner.

Still another object of the present invention is to provide a process and apparatus for positioning and sealing restored photostimuable phosphor imaging plates to ensure effective enclosure within a barrier envelope.

Yet another object of the present invention is to provide a process and apparatus for positioning and sealing restored photostimuable phosphor imaging plates within barrier envelopes requiring minimal manipulation of restored photostimuable phosphor imaging plates.

A still further object of the present invention is to provide a barrier envelope blank for restored photostimuable phosphor imaging plate of facile handling.

Still another object of the present invention is to provide a barrier envelope blank for restored photostimuable phosphor imaging plate provide aseptic properties to a resulting barrier envelope enclosing an imaging plate.

SUMMARY OF THE INVENTION

These and other objects of the present invention are achieved by a process and apparatus for positioning and sealing photostimuable phosphor imaging plates within barriers envelopes blanks formed on a roll thereof wherein a barrier envelope blank including a U-shaped heat sealed portion thereof of such a roll is indexed to a positioning station whereat the barrier envelope blank is caused to be opened at a free end thereof thereby permitting insertion of a restored imaging plate into such barrier envelope blank whereupon the barrier envelope blank including restored imaging plate is indexed to station whereat heat sealing of the free end of the U-shaped heat sealed is effected to thereby encloses the restored imaging plate therein and thereafter the thus heat sealed barrier envelope is indexed to a product station for removal from the roll of barrier envelope blanks.

BRIEF DESCRIPTION OF THE DRAWINGS

Further objects and advantages of the process and apparatus of the present invention will become more readily apparent from the following detailed description thereof when taken with the accompanying drawings wherein like numerals designate like parts throughout.

DETAILED DESCRIPTION OF THE PRESENT INVENTION

Figure 1:
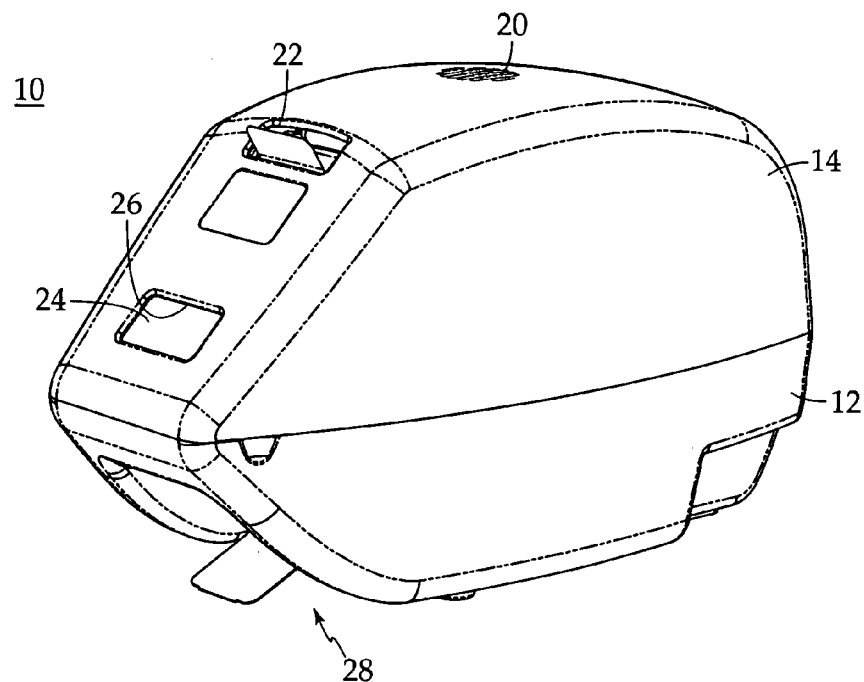
FIG. 1 is an isometric view of the apparatus of the present invention.
Figure 4:
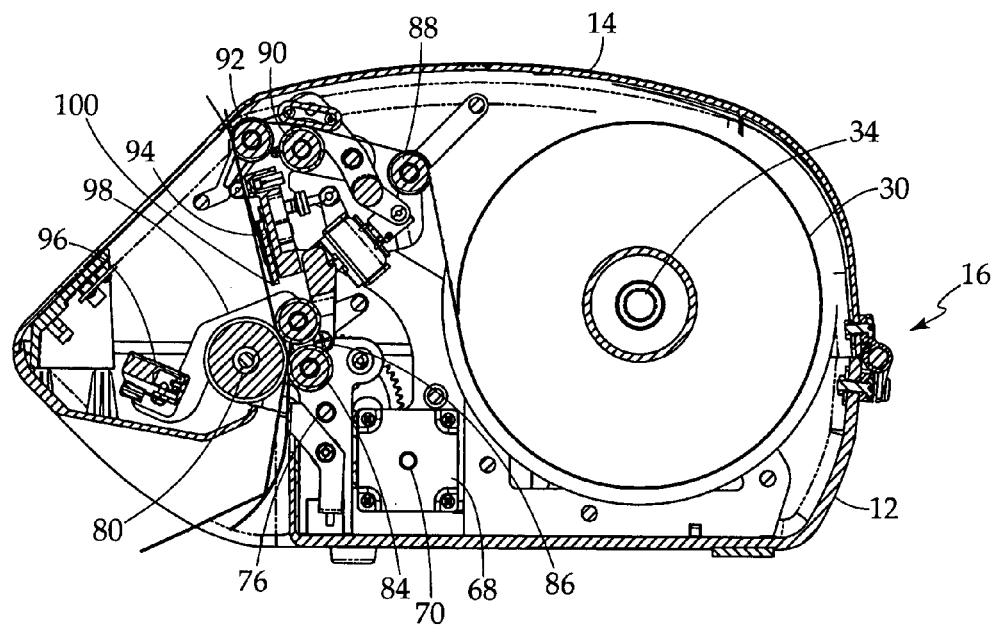
FIG. 4 is a cross-sectional view of the apparatus of FIG. 1.
Figure 5:
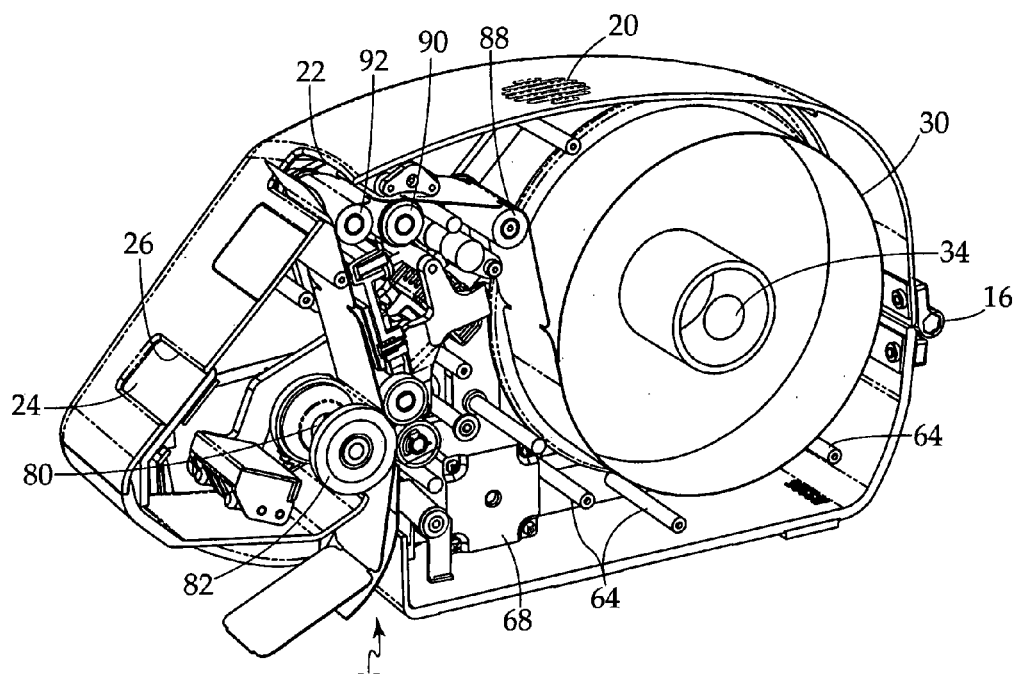
FIG. 5 is an isometric view of the apparatus of the present invention as illustrated in FIG. 4.
Figure 6:
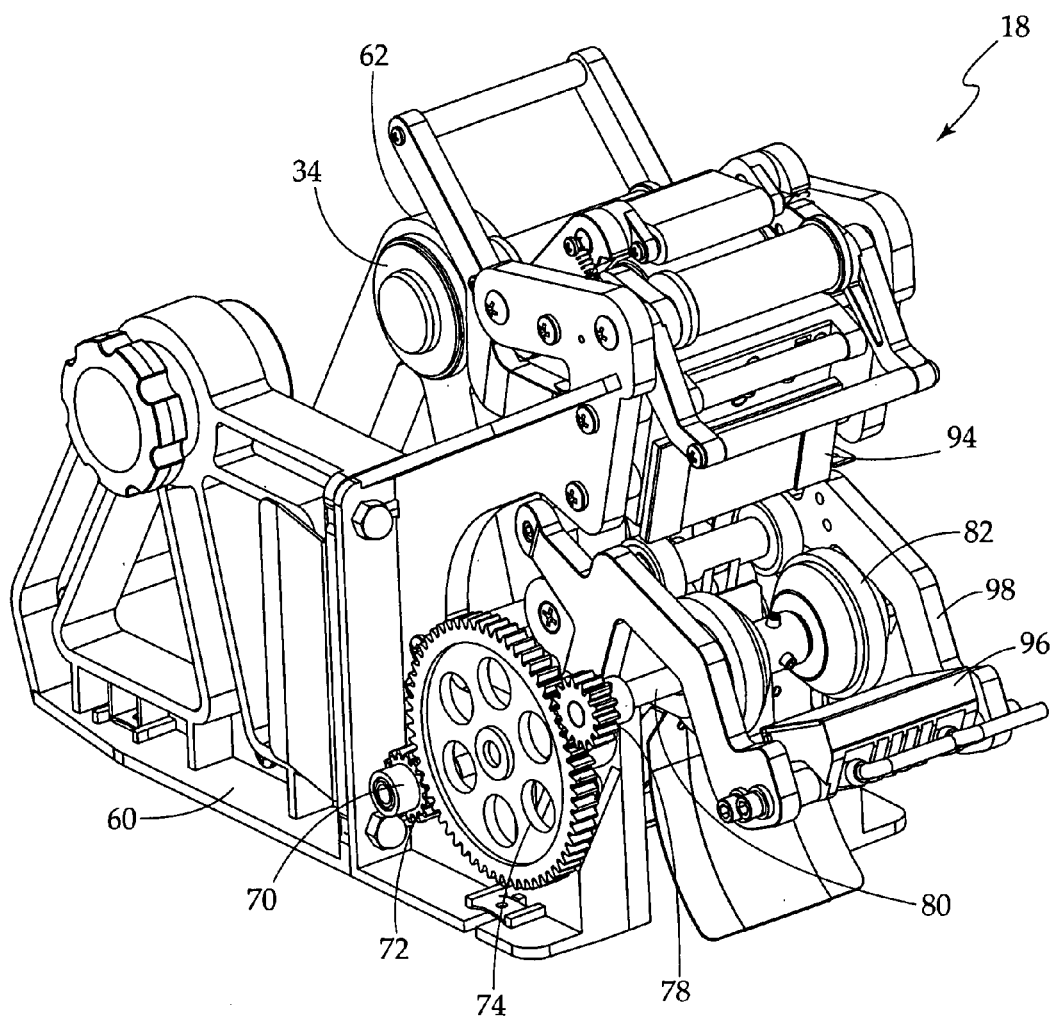
FIG. 6 is an isometric view of the positioning and sealing assembly positioned within the apparatus of the present invention.

Referring now to the drawings, and particularly FIGS. 1, 4 and 5, there is illustrated the apparatus of the present invention, generally indicated as 10, comprised of a base member 12 and cover member 14 hingeably mounted thereto by a hinge assembly, generally indicated as 16. Within the base member 12, there is mounted a positioning and sealing assembly, generally indicated as 18, referring specifically to FIG. 6, as more fully hereinafter described.

The cover member 14, referring again to FIGS. 1, 4 and 5, there is formed a centrally-disposed upper louvered portion 20 and a centrally-disposed restored imaging plate positioning opening 22. An activation button member 24 is disposed within an opening 26 in a forward portion thereof. The base member 12 is formed with a product exit port, generally indicated as 28, proximate the front portion thereof, as more fully hereinafter described.

The apparatus 10 of the present invention processes a roll, generally indicated as 30, of barrier envelope blanks $BE_1$, $BE_2$, $BE_3$ and $BE_n$, delineated by a perforated line 32 there between and mounted on cylindrically-shaped shaft portions 34 of the positioning and sealing assembly 16, referring to FIGS. 2 to 5. The perforated line 34 facilitates separation of individual barrier envelopes BE₁ et seq.

Figure 2:
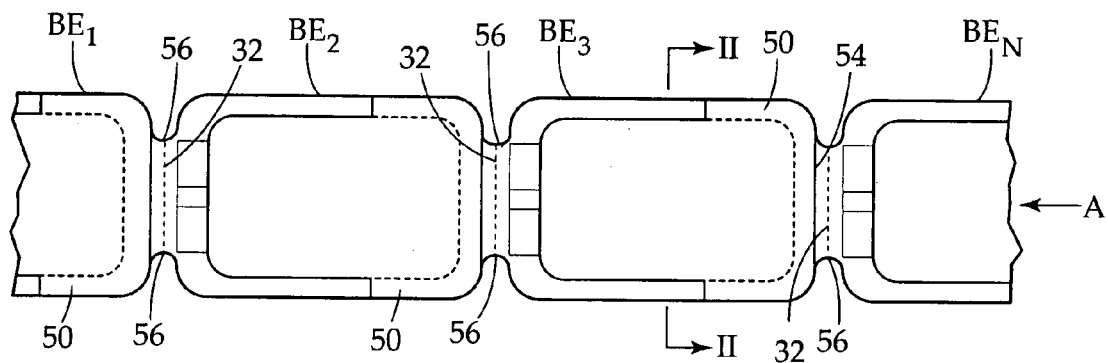
FIG. 2 is an elevational view of a portion of a roll of barrier envelope blanks used in the apparatus of the present invention.
Figure 3:
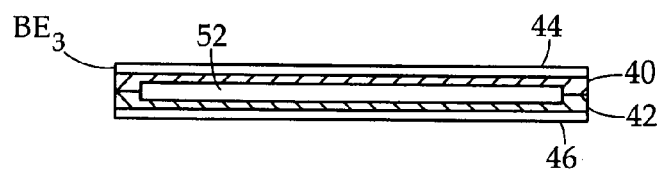
FIG. 3 is a somewhat exaggerated cross-sectional view of a barrier envelope blank of FIG. 2 taken along the lines II-II of FIG. 2.

Each barrier envelope blank BE, referring to FIGS. 2 and 3, is comprised of a transparent front layer 40 and a back opaque layer 42 formed of a thermoplastic material and a fronting paper layer 44 and backing paper layer 46, respectively, mounted by alight adhesive to the transparent front layer 40 and the back opaque layer 42, and which may be readily removed therefrom prior to accessing the restored imaging layer in the process of use. The transparent front layer 40 and opaque back layer 42 are heat sealed to each other by a peripherally shaped, U-shaped heat sealed portion 50 (delineated by the dotted line of barrier envelope blank BE₃ in FIG. 3) thereby forming a chamber 52 for a restored imaging plate at a free end portion 54 (a trailing portion) with the direction of movement of barrier envelope blanks indicated by the arrow "A" through the positioning and sealing assembly 18, as more fully hereinafter described. On either side of the perforated line 34, there is formed a semicircular indent indicia portions 56 for sensing by appropriate sensing assembly to ensure proper registration within the positioning and sealing assembly 18.

The positioning and sealing assembly 18, referring again to FIGS. 4 to 6, is comprised of parallelledly-disposed left and right side frame members 60 and 62 (right side frame member 62 being essentially a mirror image of left side frame member 60) mounted to each other by a plurality of parallelledly-disposed intermediated arm member 64 perpendicularly-disposed to the side frame members 60 and 62. A back portion of the positioning and sealing assembly 18 includes the shaft portions 34 for positioning the roll 30 of preformed barrier envelope blanks BE. A motor 68 including a drive shaft 70 is mounted in a lower portion of the positioning and sealing assembly 18 with an end of the drive shaft 70 provided with a gear 72 in geared relationship to a driven gear member 74 mounted on a shaft 76 in geared relationship with a gear 78 mounted on a shaft 80 including clutched advancement drive roller members 82 in contacting relationship with idler wheels 84 and 86. The advancement drive roller members 82 rotate in a clockwise direction, but are free wheeling when the shaft 80 is rotated in a counter-clockwise direction during clockwise rotation of the shaft 76 in a heat sealing mode) referring to FIGS. 4 and 5. The motor 68 is connected to a memory circuit board (not shown) connected to a source of electrical energy.

Guide roller members 88, 90 and 92 are provided in the upper portion of the positioning and sealing assembly 18 defining a track for the passage of barrier envelope blanks BE from the roll 30 thereof through the apparatus of the present invention. The guide roller member 92 is positioned proximate the imaging plate positioning opening 22 of the cover member 14 thereby guiding the barrier envelope blank BE around such roller member 92 to cause an unsealed portion of the transparent thermoplastic film 40 to rotate outwardly from the opaque thermoplastic film 42 thereby exposing the chamber 52 for manual insertion of a restored imaging plate, i.e. positioning station, referring particularly to FIGS. 4 and 5.

Positioned below the roller member 92 is a heat sealing station comprised of a fixed platen member 94 and a heating platen member 96 mounted on arm members 98 mounted for rotation on shaft 76, as more fully hereinafter discussed. The fixed platen member 94 functions as an anvil for the heat sealing process. The heating platen member 96 is provided with an inverted U-shaped member (not shown) to complete sealing of a thus inserted imaging plate in the barrier envelope blank BE to complete the process of protecting the thus enclosed imaging plate within a barrier envelope.

Associated with the advancement drive roller members 80 is a sensor assembly, generally indicated as 100, which senses the registration indicia portions 56 to insure proper registration of barrier envelope blanks being processed and alignment within the heat sealing station.

In operation, referring to FIGS. 4 and 5, a barrier envelope blank BE is indexed to the positioning exit 22 of the top member 14 wherein chamber 50 thereof is accessible for manual insertion of a restored imaging plate. After insertion, the activation button 24 is contacted to cause the platen member 96 to be raised to processing temperature and the motor 68 activated to rotate the shaft 70 and consequently the shaft 76 via the gears 72 and 74 incrementally to rotate the platen member 96 into contact with the platen member 94 effect contact between the heat sealing elements for a time sufficient to completely heat seal the thus positioned imaging plate within the barrier envelope blank to for a barrier envelope of such imaging plate. Thereafter, the motor 68 is caused to rotate in an opposite direction returning the platen member 96 to its rest position while simultaneously rotating the shaft 80 including the advancement drive rollers 82 to cause the roll 30 of barrier envelope blanks to be advanced by a length dimension determined by the distance between separation lines thereby passing the barrier envelope including encapsulated imaging plate to the product removal station 28.

It will be understood by one skilled in the art, that the process and apparatus of the present invention is capable of processing barrier envelope blanks of varying dimension to accommodate imaging plates of various sizes used in the dental operatory. Accordingly, the process and apparatus of the present invention is accordingly adjusted prior to processing barrier envelope blanks of such varying dimension.

While the present invention has been described in connection with an exemplary embodiment thereof, it will be understood that may modifications thereof will be apparent to those of ordinary skill in the art and that this application is intended to cover any adaptations or variations thereof, and therefore it is manifestly intended that this invention be only limited by the claims and the equivalents thereof.

What is claimed:

1. A process for encapsulating a photo-stimuable phosphor imaging plate, which comprises:
   providing a barrier envelope blank comprising a front transparent film and a rear opaque film of thermoplastic material;
   transporting said barrier envelope blank to a positioning station, and positioning said imaging plate between said rear film and said front film of thermoplastic material at said positioning station;
   transporting said barrier envelope blank with said imaging plate therein to a heat sealing station, heat sealing said front film to said rear film peripherally about said imaging plate at said heat sealing station to form a barrier envelope including said imaging plate; and
   transporting said heat sealed barrier envelope including said imaging plate to a recovery station.

2. The process for encapsulating a photo-stimuable phosphor imaging plate as defined in claim 1 wherein said front film is partially heat sealed to said rear film prior to positioning of said imaging plate to thereby form a barrier envelope around said imaging plate.

3. The process for encapsulating a photo-stimuable phosphor imaging plate as defined in claim 1 wherein a plurality of said barrier envelope blanks are formed on a roll and respective barrier envelope blanks are provided with a separation line therebetween to delineate respective barrier envelope blanks.

4. The process for encapsulating a photo-stimuable phosphor imaging plate as defined in claim 3 wherein positioning of said imaging plate between said films is effected in a positioning station of an apparatus for processing said photo-stimuable phosphor imaging plate.

5. The process for encapsulating a photo-stimuable phosphor imaging plate as defined in claim 4 wherein heating sealing is effected in a heat sealing station of said apparatus.

6. The process for encapsulating a photo-stimuable phosphor imaging plate as defined in claim 5 wherein said barrier envelope blanks are indexed between said stations.

7. The process for encapsulating a photo-stimuable phosphor imaging plate as defined in claim 6 wherein said encapsulating barrier envelope is indexed to a product recovery station of said apparatus.

8. A system for encapsulating a restored photo-stimuable phosphor imaging plate in a barrier envelope blank having an access opening, which comprises:
   a supply of barrier envelope blanks, wherein each of said barrier envelope blanks comprises a front transparent film and a rear opaque film of thermoplastic material;
   a positioning station for manual positioning of said imaging plate in said barrier envelope blank through said access opening;
   a heat sealing station for heat sealing of said imaging plate within said barrier envelope blank to form a barrier envelope including said imaging plate;
   a product recovery station for said barrier envelope including said imaging plate; and
   means for transporting said barrier envelope blank sequentially to said stations.

9. The system for encapsulating a restored photo-stimuable phosphor imaging plate in a barrier envelope blank having an access opening as defined in claim 8 wherein said supply of barrier envelope blanks is formed on a roll thereof, said barrier envelope blanks delineated by a separation line therebetween and said roll is mounted in said apparatus co-axially disposed to said means for transporting said barrier envelope blank to said stations.

10. The system for encapsulating a restored photo-stimuable phosphor imaging plate in a barrier envelope blank having an access opening as defined in claim 9 wherein each of said barrier envelope blanks is formed with a U-shaped heat sealed portion with a base portion thereof disposed on a leading edge portion of said barrier envelope blank whereby positioning of said barrier envelope blank at said positioning station causes a free end portion of said transparent front film to separate from said opaque rear film to permit access of said restored imaging plate within said barrier envelope blank.

11. The system for encapsulating a restored photo-stimuable phosphor imaging plate in a barrier envelope blank having an access opening as defined in claim 10 and further including means for indexing said barrier envelope blanks and barrier envelopes through said stations by a dimension defined by the distance between said separation lines between said barrier envelope blanks.

* * * * *